US009729579B1

(12) United States Patent
Marino et al.

(10) Patent No.: US 9,729,579 B1
(45) Date of Patent: Aug. 8, 2017

(54) SYSTEMS AND METHODS FOR INCREASING SECURITY ON COMPUTING SYSTEMS THAT LAUNCH APPLICATION CONTAINERS

(71) Applicant: Symantec Corporation, Mountain View, CA (US)

(72) Inventors: Daniel Marino, Los Angeles, CA (US); Petros Efstathopoulos, Los Angeles, CA (US); Mingwei Zhang, East Setauket, NY (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/697,016

(22) Filed: Apr. 27, 2015

(51) Int. Cl.
*H04L 29/06* (2006.01)
(52) U.S. Cl.
CPC .............. *H04L 63/20* (2013.01); *H04L 63/08* (2013.01)
(58) Field of Classification Search
CPC ................................. H04L 63/20; H04L 63/08
See application file for complete search history.

(56) References Cited

U.S. PATENT DOCUMENTS

| 2005/0273851 A1* | 12/2005 | Raju Datla | H04L 63/1433 726/14 |
| 2009/0300709 A1* | 12/2009 | Chen | G06F 17/30893 726/1 |
| 2014/0007192 A1* | 1/2014 | Qureshi | G06F 21/10 726/3 |
| 2014/0007222 A1* | 1/2014 | Qureshi | G06F 21/10 726/16 |
| 2014/0040979 A1* | 2/2014 | Barton | H04L 63/20 726/1 |
| 2014/0331119 A1* | 11/2014 | Dixon | H04L 63/168 715/234 |
| 2015/0089577 A1* | 3/2015 | Beckman | H04L 63/105 726/1 |
| 2016/0099972 A1* | 4/2016 | Qureshi | H04L 63/20 726/1 |

(Continued)

OTHER PUBLICATIONS

"Docker", https://www.docker.com/, as accessed Feb. 27, 2015, (Dec. 21, 1996).

(Continued)

*Primary Examiner* — Mahfuzur Rahman
(74) *Attorney, Agent, or Firm* — FisherBroyles LLP

(57) ABSTRACT

A computer-implemented method for increasing security on computing systems that launch application containers may include (1) authenticating an application container that facilitates launching at least one application on a host computing system by verifying that the application container meets a certain trustworthiness threshold, (2) intercepting, via a policy-enforcement proxy, a command to perform a deployment action on the host computing system in connection with the authenticated application container, (3) determining that the deployment action potentially violates a security policy applied to the authenticated application container, and then in response to determining that the deployment action potentially violates the security policy, (4) modifying, via the policy-enforcement proxy, the command to prevent the potential violation of the security policy. Various other methods, systems, and computer-readable media are also disclosed.

20 Claims, 7 Drawing Sheets

(56) References Cited

U.S. PATENT DOCUMENTS

2016/0335110 A1* 11/2016 Paithane ............. G06F 9/45558

OTHER PUBLICATIONS

"Kubernetes", http://kubernetes.io/, as accessed Feb. 27, 2015, (Oct. 19, 2014).
"Critical System Protection", http://www.symantec.com/connect/symantecproduct/critical-system-protection, as accessed Feb. 27, 2015, Symantec Corporation, (On or before Feb. 27, 2015).
"Bit9", https://www.bit9.com/, as accessed Feb. 27, 2015, (Feb. 2, 2001).
"Lumension® Application Control", https://www.lumension.com/application-control-software.aspx, as accessed Feb. 27, 2015, (Oct. 19, 2009).
"McAfee Application Control", http://www.mcafee.com/us/products/application-control.aspx, as accessed Feb. 27, 2015, (Dec. 12, 2010).
"lmctfy (Let Me Contain That for You)", http://lmctfy.io/, as accessed Feb. 27, 2015, (2014).
"LinuxContainers", https://linuxcontainers.org/, as accessed Feb. 27, 2015, (Oct. 16, 2013).
"OpenVZ", https://openvz.org/Main_Page, as accessed Feb. 27, 2015, (Dec. 5, 2008).

* cited by examiner

SYSTEMS AND METHODS FOR INCREASING SECURITY ON COMPUTING SYSTEMS THAT LAUNCH APPLICATION CONTAINERS

BACKGROUND

Application container technology may utilize virtualization to allow multiple applications to run on a single operating system within a host computing system (such as a server or virtual machine). This technology may facilitate flexible and/or dynamic deployment of applications while increasing virtual capacity on limited physical resources. For example, an application container may facilitate transfer of multiple copies of an application from one computing device to another while packaging only the necessary dependent resources. Multiple application containers may run together on the same host computing system or be transferred between host computing systems.

However, due to the dynamic nature of running multiple applications and multiple application containers on host computing systems in various configurations, traditional security measures may be unable to provide enough flexibility to properly manage the application containers. For example, an application container that deploys applications with a low-security privilege may be transferred from a low-risk server to a server with highly sensitive data within a company's network of servers. In this example, an employee of the company may initiate remote execution of the application through the company's network without necessarily being aware of the heightened security risk. In another example, certain security risks may arise when a low-security application and a high-security application are running simultaneously on the same server. Accordingly, the instant disclosure identifies and addresses a need for additional and improved systems and methods for increasing security on computing systems that launch application containers.

SUMMARY

As will be described in greater detail below, the instant disclosure describes various systems and methods for increasing security on computing systems that launch application containers by ensuring application containers are authenticated before deployment on a host computing system. A policy-enforcement proxy may further analyze commands to deploy authenticated application containers and/or modify commands in order to comply with a security policy.

In one example, a computer-implemented method for increasing security on computing systems that launch application containers may include (1) authenticating an application container that facilitates launching at least one application on a host computing system by verifying that the application container meets a certain trustworthiness threshold, (2) intercepting, via a policy-enforcement proxy, a command to perform a deployment action on the host computing system in connection with the authenticated application container, (3) determining that the deployment action potentially violates a security policy applied to the authenticated application container, and then in response to determining that the deployment action potentially violates the security policy, (4) modifying, via the policy-enforcement proxy, the command to prevent the potential violation of the security policy.

In some examples, verifying that the application container meets the certain trustworthiness threshold may include confirming an identity of the application container. These examples may also include confirming an integrity level of the application container by identifying a version of the application container and/or ensuring that the version of the application container has been digitally signed through a code signing process.

In one embodiment, intercepting the command to perform the deployment action may include receiving, at the policy-enforcement proxy, the command from an application deployer authorized to modify deployment of the application. In this embodiment, the application deployer authorized to modify deployment of the application may include a user of the application launched by the application container, an administrator of the host computing system, and/or application management software.

In one example, the security policy may include a set of rules that define a whitelist of application containers allowed to deploy on the host computing system. In this example, the security policy may also include permissions for resources used by whitelisted application containers on the host computing system and/or configurations of whitelisted application containers allowed to deploy concurrently on the host computing system.

In some embodiments, determining that the deployment action potentially violates the security policy applied to the authenticated application container may include determining, based at least in part on the whitelist of application containers, that a privilege level of the authenticated application container prohibits access to a resource on the host computing system. Such embodiments may also include determining that a configuration of the authenticated application container with existing application containers deployed on the host computing system is prohibited in the security policy. In these embodiments, the resource on the host computing system may include data residing on a file system of the host computing system, software running on the host computing system, hardware incorporated into the host computing system, and/or a network connection of the host computing system.

In one example, modifying the command to prevent the potential violation of the security policy may include identifying a different deployment action that does not violate the security policy. This example may further include adding the different deployment action to the command. In this example, the different deployment action may include transferring the application container to a different host computing system that does not violate the security policy, modifying access to the host computing system based at least in part on the security policy, and/or canceling the command to perform the deployment action.

In some examples, the computer-implemented method may further include forwarding the modified command from the policy-enforcing proxy to an application-container management process on the host computing system in accordance with the security policy. In such examples, the policy-enforcing proxy may include a software implementation designed to mimic the application programming interface of the application-container management process on the host computing system.

In one embodiment, a system for implementing the above-described method may include (1) an authentication module, stored in memory, that authenticates an application container that facilitates launching at least one application on a host computing system by verifying that the application container meets a certain trustworthiness threshold, (2) an interception module, stored in memory, that intercepts, via a policy-enforcement proxy, a command to perform a deployment action on the host computing system in connection with the authenticated application container, (3) a determination module, stored in memory, that determines that the deployment action potentially violates a security policy applied to the authenticated application container, (4) a modification module, stored in memory, that modifies, via the policy-enforcement proxy, the command to prevent the potential violation of the security policy in response to the determination that the deployment action potentially violates the security policy, and (5) at least one physical processor that executes the authentication module, the interception module, the determination module, and the modification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) authenticate an application container that facilitates launching at least one application on a host computing system by verifying that the application container meets a certain trustworthiness threshold, (2) intercept, via a policy-enforcement proxy, a command to perform a deployment action on the host computing system in connection with the authenticated application container, (3) determine that the deployment action potentially violates a security policy applied to the authenticated application container, and then in response to determining that the deployment action potentially violates the security policy, (4) modify, via the policy-enforcement proxy, the command to prevent the potential violation of the security policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
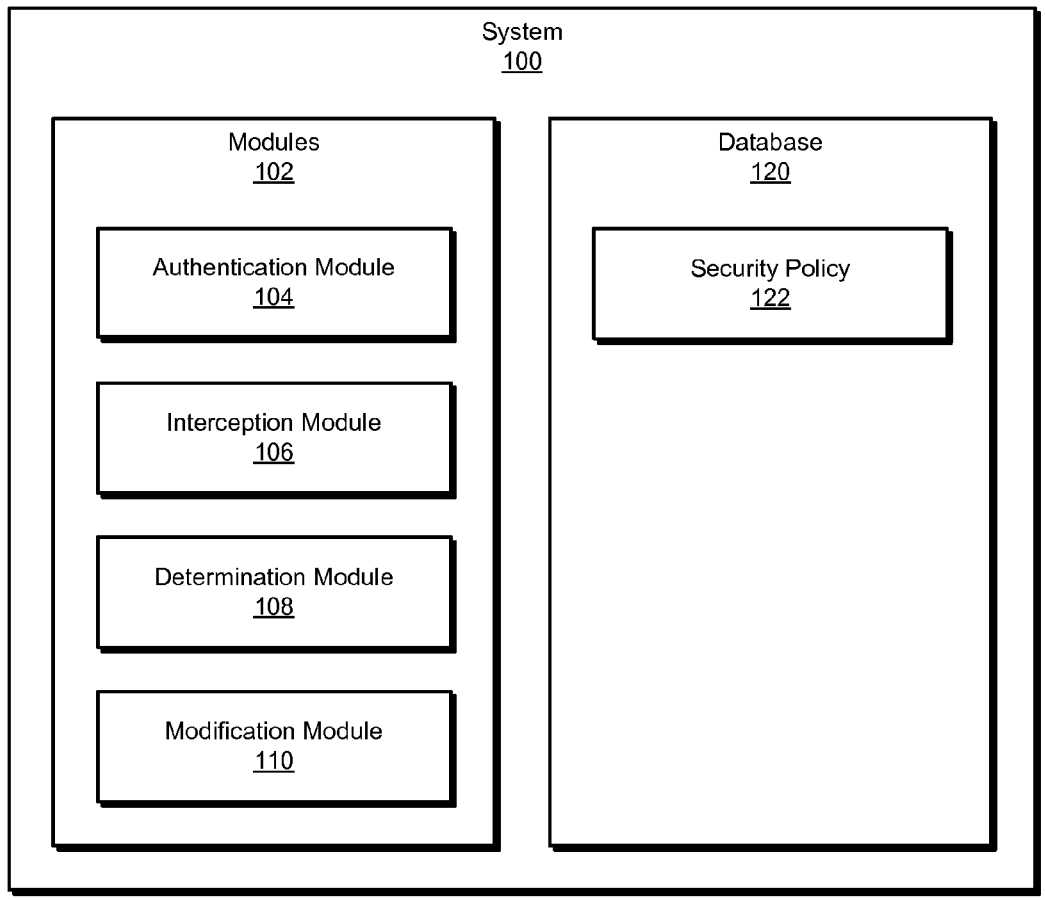
FIG. 1 is a block diagram of an exemplary system for increasing security on computing systems that launch application containers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for increasing security on computing systems that launch application containers. As will be explained in greater detail below, by implementing a policy-enforcement proxy, the systems and methods described herein may provide an added layer of security when deploying application containers. For example, by defining a security policy with rules to manage various configurations of application containers running on multiple host computing systems, the systems and methods described herein may enforce security privileges by modifying commands to deploy application containers in order to comply with the security policy. Moreover, in some embodiments, the various systems and methods described herein may utilize code signing to authenticate application containers prior to deployment.

Figure 2:
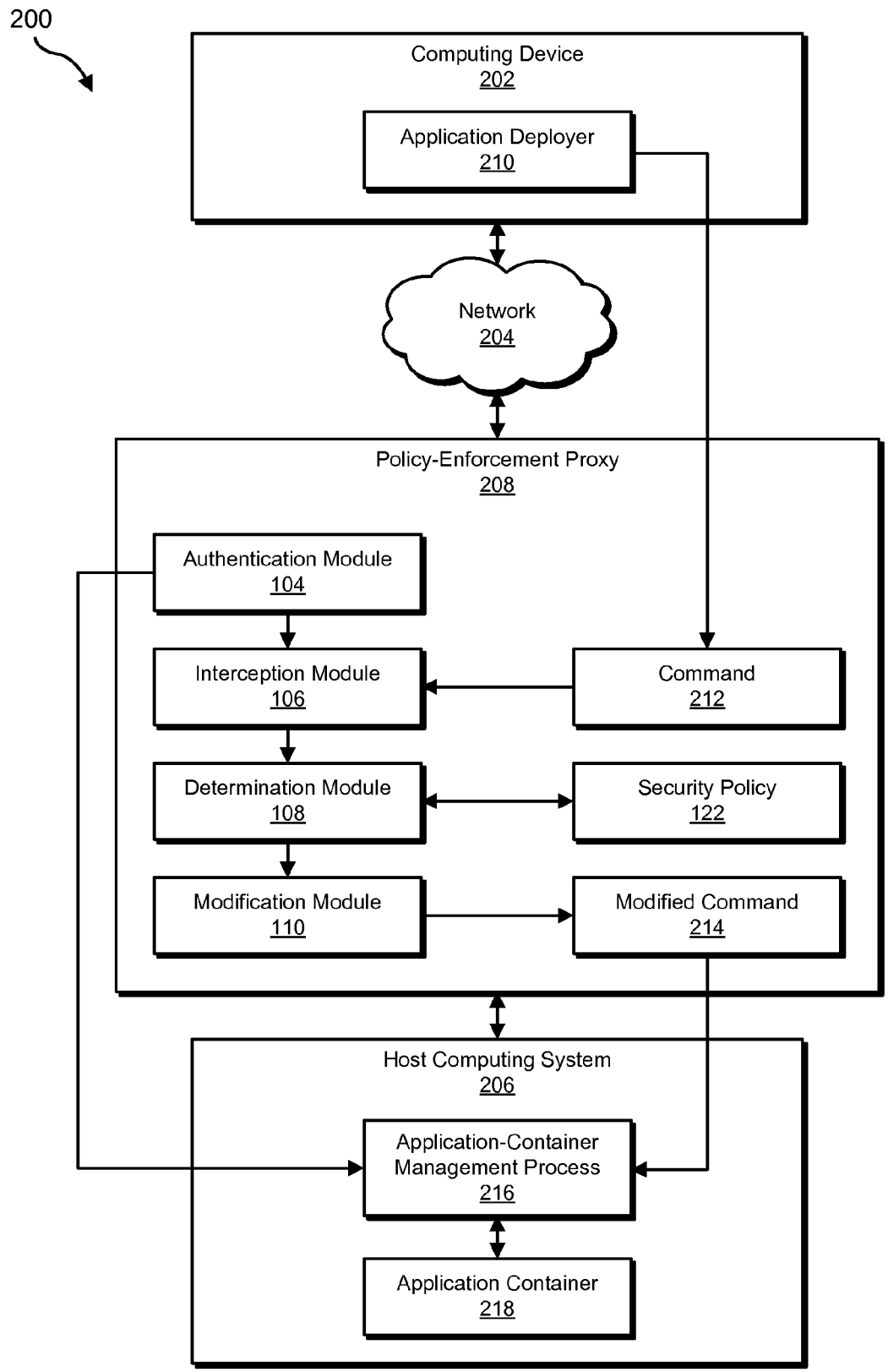
FIG. 2 is a block diagram of an additional exemplary system for increasing security on computing systems that launch application containers.

The following will provide, with reference to FIGS. 1-2, detailed descriptions of exemplary systems for increasing security on computing systems that launch application containers. Detailed descriptions of corresponding computer-implemented methods will be provided in connection with FIG. 3. In addition, detailed descriptions of an exemplary security policy for managing application containers will be provided in connection with FIG. 4. Furthermore, detailed descriptions of an exemplary modification of a command to deploy an application container will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for increasing security on computing systems that launch application containers. As illustrated in this figure, exemplary system 100 may include one or more modules 102 for performing one or more tasks. For example, and as will be explained in greater detail below, exemplary system 100 may include an authentication module 104 that authenticates an application container that facilitates launching at least one application on a host computing system by verifying that the application container meets a certain trustworthiness threshold. Exemplary system 100 may additionally include an interception module 106 that intercepts, via a policy-enforcement proxy, a command to perform a deployment action on the host computing system in connection with the authenticated application container.

In addition, and as will be described in greater detail below, exemplary system 100 may also include a determination module 108 that determines that the deployment action potentially violates a security policy applied to the authenticated application container. Finally, exemplary system 100 may include a modification module 110 that modifies, via the policy-enforcement proxy, the command to prevent the potential violation of the security policy in response to the determination that the deployment action potentially violates the security policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, host computing system 206, and/or policy-enforcement proxy 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a security policy 122. In this example, security policy 122 may include and/or define various rules for deploying application containers on host computing systems.

In one embodiment, security policy 122 may include a set of rules that define a whitelist of application containers allowed to deploy on a host computing system 206 in FIG. 2, permissions for resources used by whitelisted application containers on host computing system 206, and/or configurations of whitelisted application containers allowed to deploy concurrently on host computing system 206. In some examples, security policy 122 may be defined by a system administrator and/or application management software. Additionally or alternatively, security policy 122 may dynamically adapt to changes in infrastructure and/or application container deployment.

The term "whitelist," as used herein, generally refers to a list of items (e.g., application containers) with certain privileges and/or access. In some examples, whitelisting may include defining security policies of varying levels of trust for clusters of applications and/or application containers on host computing systems. Examples of application whitelisting solutions include, without limitation, SYMANTEC CRITICAL SYSTEM PROTECTION (CSP), BIT9 PARITY, LUMENSION APPLICATION CONTROL, MCAFEE APPLICATION CONTROL, variations of one or more of the same, combinations of one or more of the same, or any other suitable solutions. In some embodiments, the resources used by whitelisted application containers on host computing system 206 may include, without limitation, data residing on a file system of host computing system 206, software running on host computing system 206, hardware incorporated into host computing system 206, and/or a network connection of host computing system 206.

Database 120 may represent portions of a single database or computing device or a plurality of databases or computing devices. For example, database 120 may represent a portion of a policy-enforcement proxy 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as policy-enforcement proxy 208 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a policy-enforcement proxy 208 via a network 204. In addition, system 200 may include a host computing system 206 in communication with policy-enforcement proxy 208 and/or in communication with computing device 202 via policy-enforcement proxy 208 and/or network 204.

As shown in FIG. 2, computing device 202 may include and/or be used by an application deployer 210 authorized to modify deployment of an application on host computing system 206 by sending a command 212. In this example, application deployer 210 may include and/or represent a user, administrator, and/or application management software. In addition, policy-enforcement proxy 208 may intercept command 212 and/or forward a modified command 214 to host computing system 206 in accordance with security policy 122. Furthermore, host computing system 206 may include an application-container management process 216 capable of receiving modified command 214 from policy-enforcement proxy 208. Application-container management process 216 may interact with an application container 218 on host computing system 206 to deploy an application based on modified command 214.

In one example, computing device 202 may be programmed with one or more of modules 102 and/or may store all or a portion of the data in database 120. Additionally or alternatively, host computing system 206 may be programmed with one or more of modules 102 and/or may store all or a portion of the data in database 120. Furthermore, policy-enforcement proxy 208 may be programmed with one or more of modules 102 and/or may store all or a portion of the data in database 120.

In one embodiment, one or more of modules 102 from FIG. 1 may, when executed by at least one processor of computing device 202, host computing system 206, and/or policy-enforcement proxy 208, enable computing device 202, host computing system 206, and/or policy-enforcement proxy 208 to manage application containers. For example, and as will be described in greater detail below, authentication module 104 may authenticate application container 218 that facilitates launching at least one application on host computing system 206 by verifying that application container 218 meets a certain trustworthiness threshold. Interception module 106 may intercept, via policy-enforcement proxy 208, command 212 to perform a deployment action on host computing system 206 in connection with authenticated application container 218. Determination module 108 may determine that the deployment action potentially violates security policy 122 applied to authenticated application container 218. Modification module 110 may modify, via policy-enforcement proxy 208, command 212 to prevent the potential violation of security policy 122 in response to the determination that the deployment action potentially violates security policy 122.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Host computing system 206 generally represents any type or form of computing device capable of deploying an application isolated by an application container. Examples of host computing system 206 include, without limitation, application servers and database servers configured to provide various database services and/or run certain software applications.

Policy-enforcement proxy 208 generally represents any type or form of software module and/or computing device capable of managing application containers on host computing systems. Examples of policy-enforcement proxy 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, any other suitable computing device, and/or software modules running on one or more of the same. Although policy-enforcement proxy 208, computing device 202, and host computing system 206 are illustrated as separate entities in FIG. 2, policy-enforcement proxy 208 may alternatively represent a software module running on computing device 202 and/or host computing system 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and policy-enforcement proxy 208.

Application-container management process 216 generally represents any type or form of software application or program that manages application containers and/or containerized applications within a computing system. In some embodiments, application-container management process 216 may execute clusters of application containers on various computing infrastructures. In other embodiments, application-container management process 216 may execute an application container on a multitude of host computing systems. Examples of application-container management process 216 include, without limitation, KUBERNETES, DOCKER management processes, variations of one or more of the same, combinations of one or more of the same, and/or other forms of container management systems. Additionally or alternatively, application-container management process 216 may serve and/or act as an application deployer.

Application container 218 generally represents any type or form of software implementation that isolates an application running on an operating system through operating-system-level virtualization. Notably, application containers may isolate resources and/or services of the operating system for use by the application. Application containers may each contain a single instance or multiple instances of an application and/or multiple applications. Examples of application container 218 include, without limitation, DOCKER containers, LET ME CONTAIN THAT FOR YOU (LM-CTFY) containers, LINUX CONTAINERS (LXC), OPENVZ containers, variations of one or more of the same, combinations of one or more of the same, or any other suitable application containers.

Figure 3:
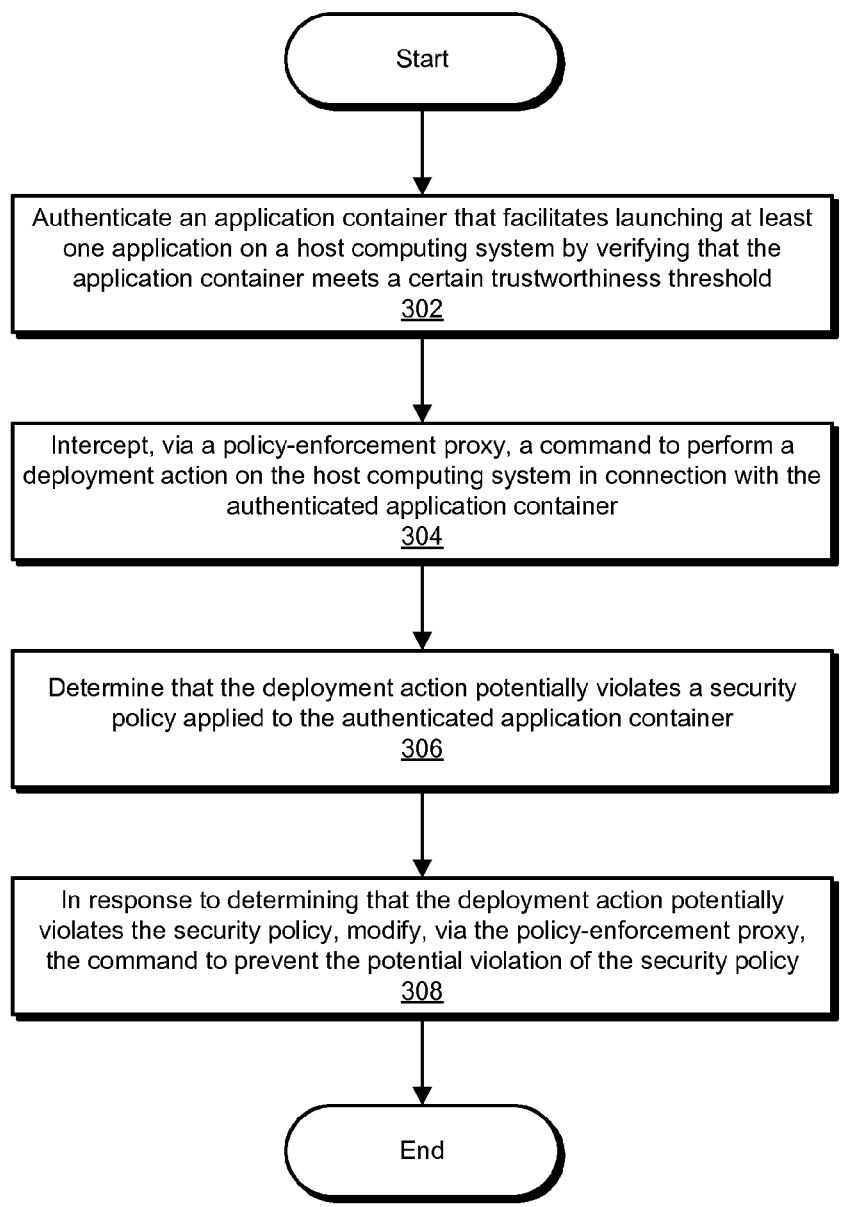
FIG. 3 is a flow diagram of an exemplary method for increasing security on computing systems that launch application containers.

FIG. 3 is a flow diagram of an exemplary computer-implemented method 300 for increasing security on computing systems that launch application containers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may authenticate an application container that facilitates launching at least one application on a host computing system by verifying that the application container meets a certain trustworthiness threshold. For example, authentication module 104 may, as part of policy-enforcement proxy 208 in FIG. 2, authenticate application container 218 that facilitates launching at least one application on host computing system 206 by verifying that application container 218 meets a certain trustworthiness threshold.

As used herein, the term "application" generally refers to any type or form of software application or program capable of being installed, deployed, executed, and/or otherwise implemented on a computing system. Examples of applications include, without limitation, enterprise software, entertainment software, security applications, cloud-based applications, web applications, mobile applications, integrated software, application packages, application suites, variations of one or more of the same, combinations of one or more of the same, or any other suitable applications.

The systems described herein may perform step 302 in a variety of ways. In some examples, authentication module 104 may verify that application container 218 meets the certain trustworthiness threshold by confirming an identity of application container 218. For example, in reference to FIG. 2, authentication module 104 may verify that application container 218 contains the expected application to be deployed. Additionally or alternatively, authentication module 104 may confirm an integrity level of application container 218 by identifying a version of application container 218 and/or ensuring that the version of application container 218 has been digitally signed through a code signing process. In this example, authentication module 104 may check for potentially unverified changes to application container 218 that are not digitally signed. As shown in FIG. 2, authentication module 104 may authenticate application container 218 through interacting with application-container management process 216. Authentication module 104 may additionally or alternatively directly verify application container 218 on host computing system 206.

As used herein, the term "code signing" generally refers to a process of digitally signing a file containing code through the use of cryptography. For example, code signing may identify the author and/or the build version of application container 218 to confirm the integrity of application container 218 and/or ensure that application container 218 has not been tampered with. Examples of code signing include, but are not limited to, use of public key authentication, private key authentication, a certificate authority, difference-based file system images, cryptographic hashes, time-stamping, variations of one or more of the same, combinations of one or more of the same, or any other suitable forms of code signing. In the example of FIG. 2, application container 218 may represent a DOCKER container that uses a difference-based series of file system images. In this example, authentication module 104 may then verify that the series of file system images have been code-signed to confirm the identity and/or integrity of application container 218.

Returning to FIG. 3, at step 304, one or more of the systems described herein may intercept, via a policy-enforcement proxy, a command to perform a deployment action on the host computing system in connection with the authenticated application container. For example, interception module 106 may, as part of policy-enforcement proxy 208 in FIG. 2, intercept command 212 to facilitate performing a deployment action on host computing system 206 in connection with authenticated application container 218.

As used herein, the term "deployment action" generally refers to any type or form of action and/or operation performed on and/or by an application container and/or an application deployed via an application container. Examples of deployment actions include, but are not limited to, building, deleting, deploying, executing, importing, installing, loading, querying, quitting, running, and/or saving a computing resource, application container, and/or containerized application, variations of one or more of the same, combinations of one or more of the same, or any other suitable deployment actions.

Interception module 106 may intercept command 212 in a variety of ways. For example, interception module 106 may receive command 212 from application deployer 210. In this example, application deployer 210 may be authorized to modify deployment of the application. In some embodiments, application deployer 210 may include a user of the application launched by application container 218, an administrator of host computing system 206, and/or application management software (e.g., KUBERNETES).

For example, a user of computing device 202 may send command 212 to run a word processing application contained by application container 218 on host computing system 206. Interception module 106 may then intercept command 212 in order to prevent execution of the word processing application contained by application container 218. In another example, application management software set to automatically update a media application contained by application container 218 on host computing system 206 may send command 212 to connect the media application to the Internet to check for updates. Interception module 106 may then intercept command 212 and prevent application container 218 from accessing network resources on host computing system 206.

Returning to FIG. 3, at step 306, one or more of the systems described herein may determine that the deployment action potentially violates a security policy applied to the authenticated application container. For example, determination module 108 may, as part of policy-enforcement proxy 208 in FIG. 2, determine that the deployment action potentially violates security policy 122 applied to authenticated application container 218.

Determination module 108 may determine that the deployment action potentially violates security policy 122 in a variety of ways. In some embodiments, determination module 108 may determine, based at least in part on a whitelist of application containers, that a privilege level of authenticated application container 218 prohibits access to a resource on host computing system 206.

Figure 4:
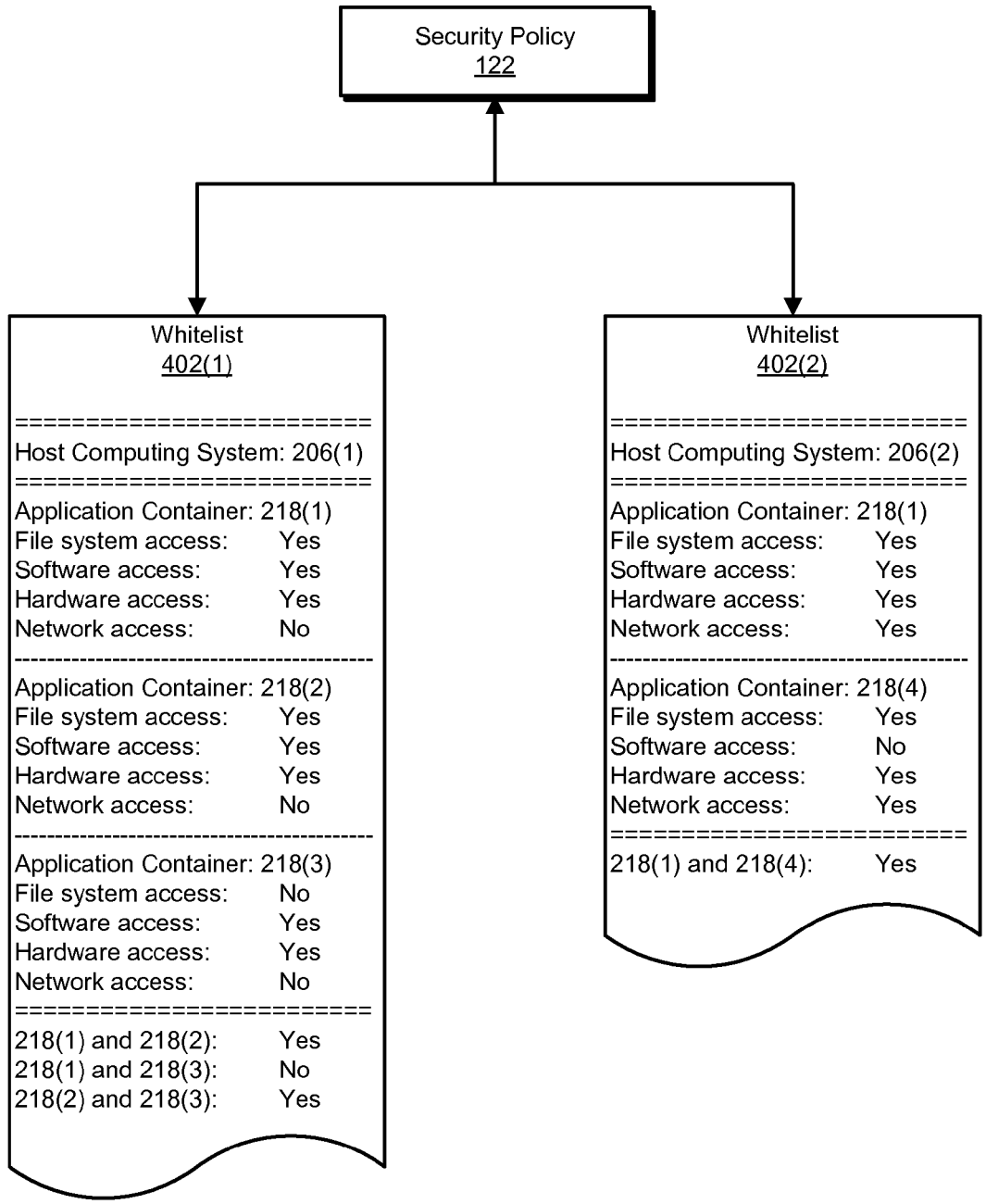
FIG. 4 is an illustration of an exemplary security policy for managing application containers.

As a specific example, FIG. 4 illustrates a whitelist 402(1) and a whitelist 402(2) as part of security policy 122 for managing application containers. As shown in FIG. 4, whitelist 402(1) may allow application containers 218(1), 218(2), and 218(3) to deploy on a host computing system 206(1). In addition, whitelist 402(1) may also define any configurations of application containers 218(1), 218(2), and 218(3) that are allowed to deploy concurrently on host computing system 206(1). In this example, application containers 218(1) and 218(3) may be unable to deploy concurrently on host computing system 206(1). Furthermore, whitelist 402(2) may define permissions for application containers 218(1) and 218(4) when running on a host computing system 206(2). In this example, whitelist 402(2) may indicate that application container 218(1) has full access to resources on host computing system 206(2) and application container 218(4) does not have access to any other software on host computing system 206(2).

In another example, determination module 108 may determine that application container 218(1) on host computing system 206(1) cannot check for updates online based on whitelist 402(1) showing application container 218(1) has no network access privilege. Additionally or alternatively, determination module 108 may determine that a configuration of authenticated application container 218 with existing application containers deployed on host computing system 206 is prohibited in security policy 122. In this example, as shown in FIG. 4, whitelist 402(1) may prevent application container 218(1) from deploying on host computing system 206(1) if application container 218(3) is already deployed on host computing system 206(1).

Returning to FIG. 3, at step 308, one or more of the systems described herein may modify, via the policy-enforcement proxy, the command to prevent the potential violation of the security policy in response to determining that the deployment action potentially violates the security policy. For example, modification module 110 may, as part of policy-enforcement proxy 208 in FIG. 2, modify command 212 in response to the determination that the deployment action potentially violates security policy 122. By modifying command 212 in this way, modification module 110 may prevent the potential violation of security policy 122.

Figure 5:
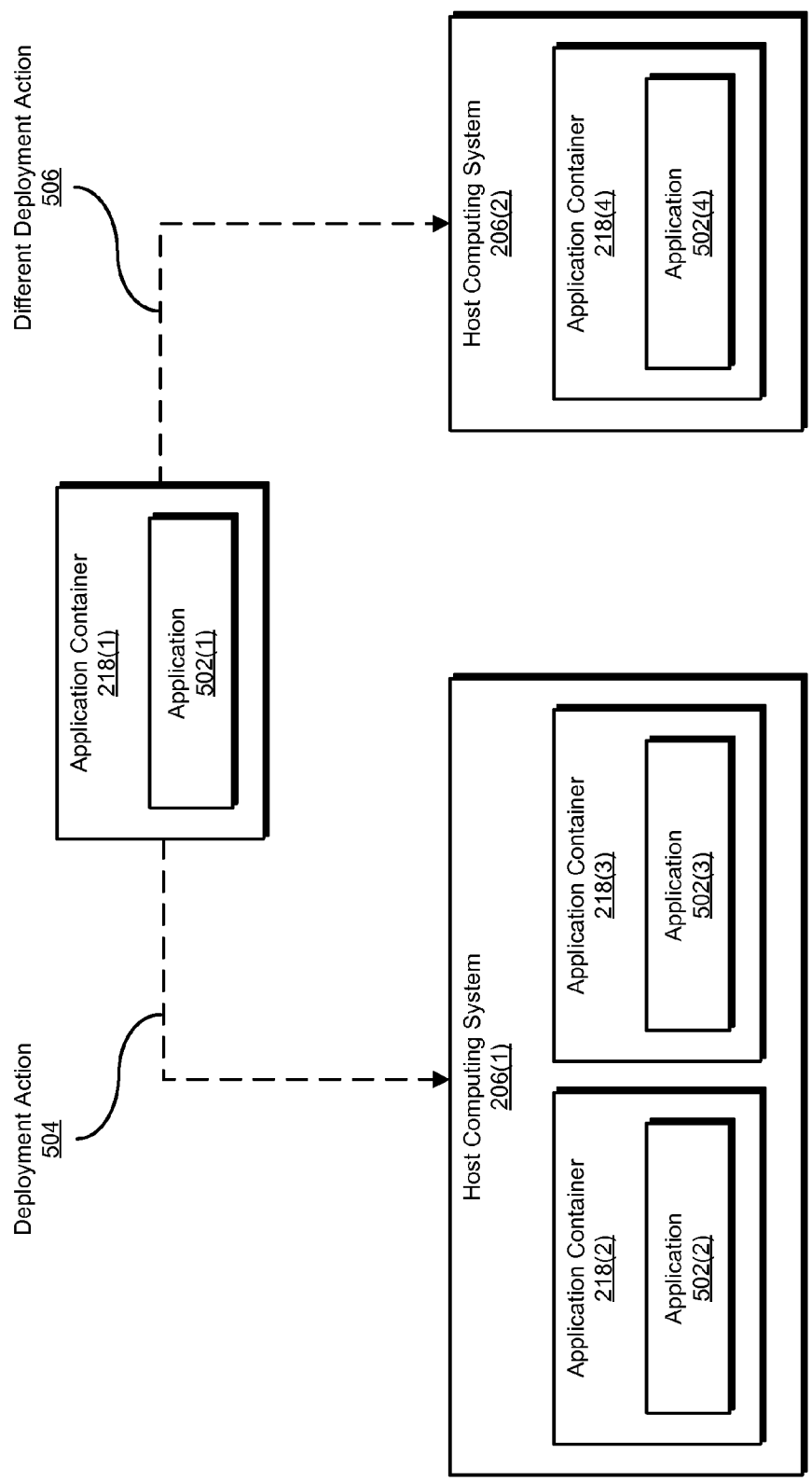
FIG. 5 is an illustration of an exemplary modification of a command to deploy an application container.

Modification module 110 may modify command 212 in a variety of ways. In some embodiments, modification module 110 may identify a different deployment action 506 in FIG. 5 that does not violate security policy 122. Additionally or alternatively, modification module 110 may add different deployment action 506 in FIG. 5 to command 212. In the example of FIG. 5, command 212 may include a deployment action 504 to deploy application container 218(1) containing an application 502(1) on host computing system 206(1). In this example, application container 218(2) containing an application 502(2) and application container 218(3) containing an application 502(3) may deploy concurrently on host computing system 206(1). Furthermore, application container 218(4) containing an application 502(4) may deploy on host computing system 206(2).

In one example, different deployment action 506 may include and/or represent transferring application container 218 to a different host computing system that does not violate security policy 122. Different deployment action 506 may also include and/or represent modifying access to host computing system 206 based at least in part on security policy 122. Additionally or alternatively, different deployment action 506 may include and/or represent canceling command 212 to perform deployment action 504. In the example of FIG. 5, different deployment action 506 may include and/or represent cancelling deployment action 504 to deploy application container 218(1) on host computing system 206(1) in accordance with whitelist 402(1) of security policy 122 in FIG. 4. Furthermore, different deployment action 506 may also include and/or represent transferring deployment of application container 218(1) to host computing system 206(2) to comply with whitelist 402(2) of security policy 122.

In some embodiments, policy-enforcing proxy 208 may further forward modified command 214 to application-container management process 216 on host computing system 206 in accordance with security policy 122. In these embodiments, modified command 214 may include different deployment action 506 from FIG. 5.

In one example, policy-enforcing proxy 208 may include a software implementation designed to mimic the application programming interface (API) of application-container management process 216 on host computing system 206. In this example, application deployer 210 may interact with policy-enforcement proxy 208 seamlessly as if interacting directly with application-container management process 216 on host computing system 206. For example, by mimicking the API of a DOCKER management process running on host computing system 206, policy-enforcement proxy 208 may easily interface with a KUBERNETES program acting as application deployer 210 for DOCKER application container 218. In other embodiments, policy-enforcing proxy 208 may include an API that does not mimic the API of application-container management process 216.

Additionally or alternatively, by utilizing application-container management process 216 on host computing system 206 to execute modified command 214 on application container 218, policy-enforcement proxy 208 may take advantage of existing privilege mechanisms present on host computing system 206. For example, application-container management process 216 may include management of a multitude of users on the operating system of host computing system 206. In this example, policy-enforcement proxy 208 may utilize application-container management process 216 to manage user privileges in addition to security policy 122.

As explained above in connection with method 300 in FIG. 3, the disclosed systems and methods may interpose a policy-enforcement proxy between an application deployer and an application-container management process. For example, the application deployer may send a command to install an application container on a host computing system. The policy-enforcement proxy may use code signing to verify that the application container is trustworthy enough to be installed and/or run.

Furthermore, the policy-enforcement proxy may then check a security policy for the privileges of the application container. The security policy may define rules for access to resources on host computing systems and/or configurations of application containers running on host computing systems. In this example, the policy-enforcement proxy may prevent the application container from deploying on the host computing system if the application container does not have the appropriate privileges.

Additionally, the policy-enforcement proxy may move the application to another host computing system that may not require a high level of trust. As another example, the security policy may prevent a low-trust application container from deploying on the host computing system until another high-trust application container ceases deployment. Furthermore the policy-enforcement proxy may build on existing security measures and/or utilize the API of local application-container management processes on host computing systems. Thus, the policy-enforcement proxy may ensure the security policy is applied to application containers running on host computing systems.

Figure 6:
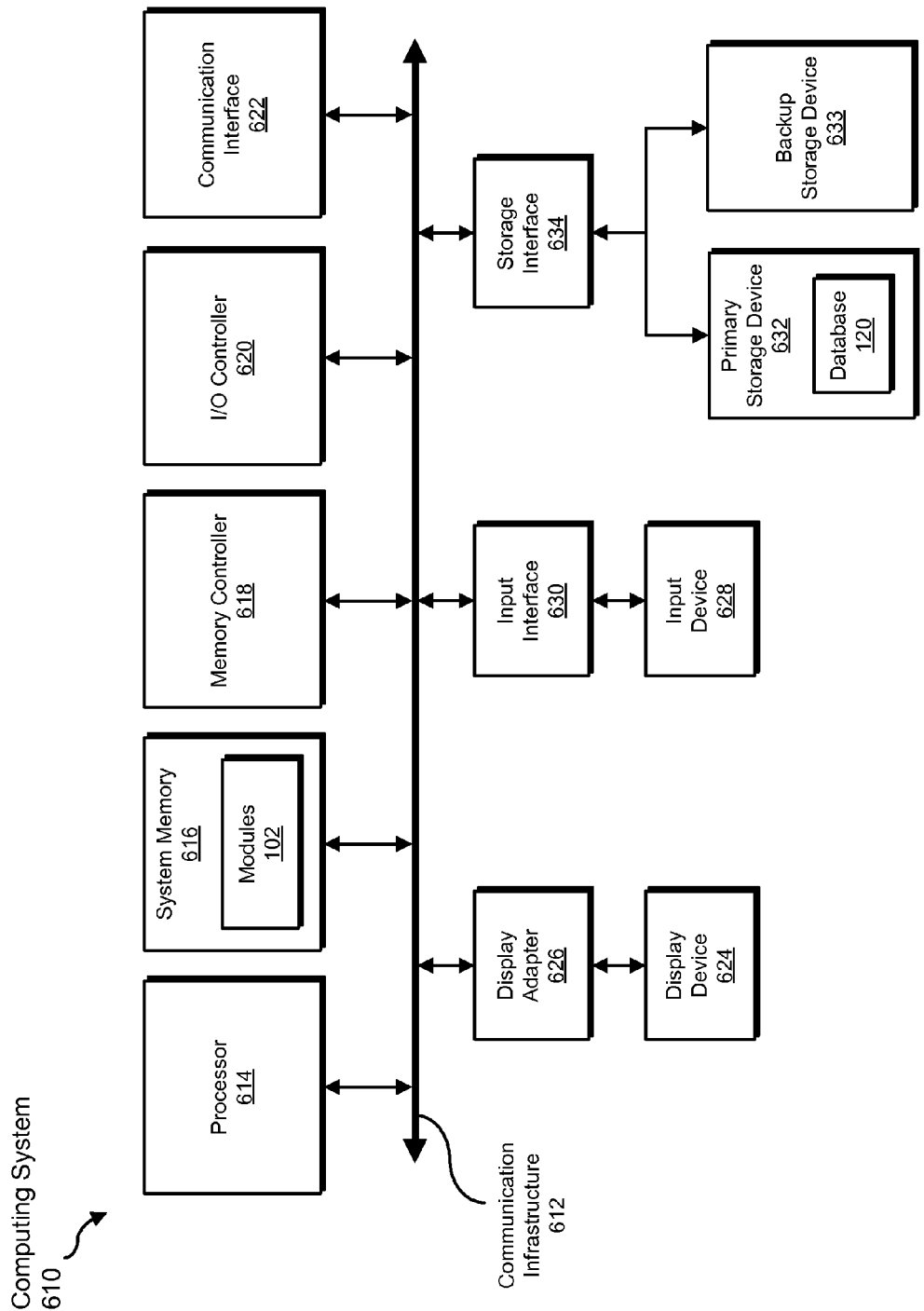
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
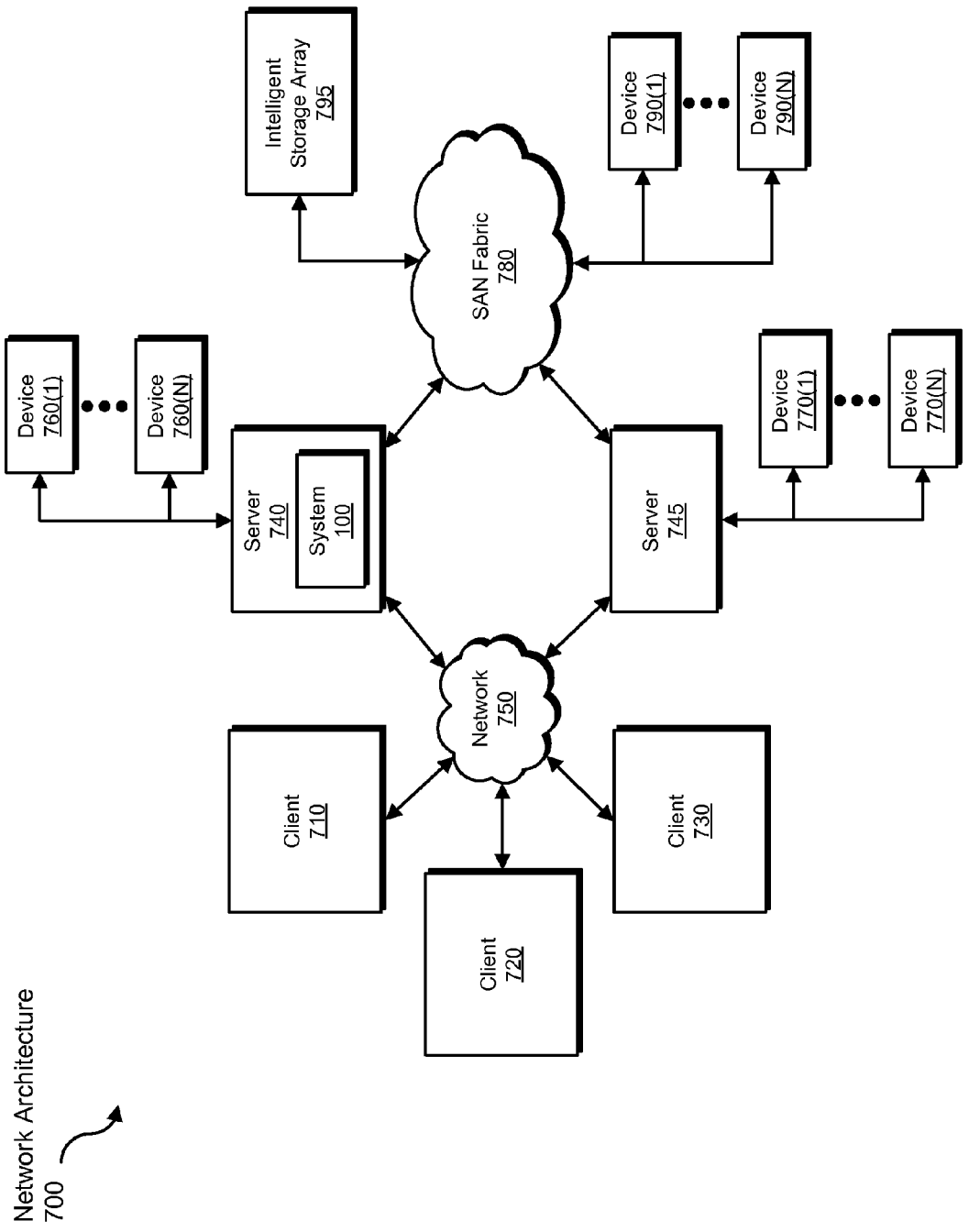
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for increasing security on computing systems that launch application containers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a command to deploy an application container on a host computing system to be transformed, transform the command, output a result of the transformation to the host computing system, use the result of the transformation to enforce a security policy for the application container, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for increasing security on computing systems that launch application containers, at least a portion of the method being performed by a computing device comprising at least one processor, the method comprising:
  authenticating, via a policy-enforcement proxy computing system, an application container programmed to facilitate launching at least one application on a host computing system by verifying that the application container meets a certain trustworthiness threshold;
  intercepting, via the policy-enforcement proxy computing system, a command to perform a deployment action on the host computing system in connection with the authenticated application container;

determining, via the policy-enforcement proxy computing system, that the deployment action in connection with the authenticated application container potentially violates a security policy for the host computing system that defines a whitelist of application containers allowed to deploy on the host computing system; and in response to determining that the deployment action potentially violates the security policy, preventing the potential violation of the security policy by modifying, via the policy-enforcement proxy computing system, the command to perform the deployment action.

2. The method of claim 1, wherein verifying that the application container meets the certain trustworthiness threshold comprises at least one of:

confirming an identity of the application container; and
confirming an integrity level of the application container by:
identifying a version of the application container; and
ensuring that the version of the application container has been digitally signed through a code signing process.

3. The method of claim 1, wherein intercepting the command to perform the deployment action comprises receiving, at the policy-enforcement proxy computing system, the command from an application deployer authorized to modify deployment of the application.

4. The method of claim 3, wherein the application deployer authorized to modify deployment of the application comprises at least one of:

a user of the application launched by the application container;
an administrator of the host computing system; and
application management software.

5. The method of claim 1, wherein the security policy comprises a set of rules that define at least one of:

permissions for resources used by whitelisted application containers on the host computing system; and
configurations of whitelisted application containers allowed to deploy concurrently on the host computing system.

6. The method of claim 5, wherein determining that the deployment action potentially violates the security policy comprises at least one of:

determining, based at least in part on the whitelist of application containers, that a privilege level of the authenticated application container prohibits access to a resource on the host computing system; and
determining that a configuration of the authenticated application container with existing application containers deployed on the host computing system is prohibited in the security policy.

7. The method of claim 6, wherein the resource on the host computing system comprises at least one of:

data residing on a file system of the host computing system;
software running on the host computing system;
hardware incorporated into the host computing system; and
a network connection of the host computing system.

8. The method of claim 1, wherein modifying the command to prevent the potential violation of the security policy comprises:

identifying a different deployment action that does not violate the security policy.

9. The method of claim 8, wherein the different deployment action comprises at least one of:

transferring the application container to a different host computing system that does not violate the security policy;
modifying access to the host computing system based at least in part on the security policy; and
canceling the command to perform the deployment action.

10. The method of claim 1, further comprising forwarding the modified command from the policy-enforcing proxy computing system to an application-container management process on the host computing system in accordance with the security policy.

11. The method of claim 10, wherein the policy-enforcing proxy computing system comprises a software implementation designed to mimic the application programming interface of the application-container management process on the host computing system.

12. A system for increasing security on computing systems that launch application containers, the system comprising:

an authentication module, stored in memory of a policy-enforcement proxy computing system, that authenticates an application container that facilitates launching at least one application on a host computing system by verifying that the application container meets a certain trustworthiness threshold;
an interception module, stored in memory of the policy-enforcement proxy computing system, that intercepts a command to perform a deployment action on the host computing system in connection with the authenticated application container;
a determination module, stored in memory of the policy-enforcement proxy computing system, that determines that the deployment action in connection with the authenticated application container potentially violates a security policy applied for the host computing system that defines a whitelist of application containers allowed to deploy on the host computing system;
a modification module, stored in memory of the policy-enforcement proxy computing system, that prevents the potential violation of the security policy by modifying the command to perform the deployment action in response to determining that the deployment action potentially violates the security policy; and
at least one processor that executes the authentication module, the interception module, the determination module, and the modification module.

13. The system of claim 12, wherein verifying that the application container meets the certain trustworthiness threshold comprises at least one of:

confirming an identity of the application container; and
confirming an integrity level of the application container by:
identifying a version of the application container; and
ensuring that the version of the application container has been digitally signed through a code signing process.

14. The system of claim 12, wherein the interception module intercepts the command to perform the deployment action by receiving, at the policy-enforcement proxy computing system, the command from an application deployer authorized to modify deployment of the application.

15. The system of claim 14, wherein the application deployer authorized to modify deployment of the application comprises at least one of:

a user of the application launched by the application container;

an administrator of the host computing system; and
application management software.

16. The system of claim 12, wherein the security policy comprises a set of rules that define at least one of:
   permissions for resources used by whitelisted application containers on the host computing system; and
   configurations of whitelisted application containers allowed to deploy concurrently on the host computing system.

17. The system of claim 16, wherein the determination module determines that the deployment action potentially violates the security policy by at least one of:
   determining, based at least in part on the whitelist of application containers, that a privilege level of the authenticated application container prohibits access to a resource on the host computing system; and
   determining that a configuration of the authenticated application container with existing application containers deployed on the host computing system is prohibited in the security policy.

18. The system of claim 17, wherein the resource on the host computing system comprises at least one of:
   data residing on a file system of the host computing system;
   software running on the host computing system;
   hardware incorporated into the host computing system; and
   a network connection of the host computing system.

19. The system of claim 12, wherein the modification module modifies the command to prevent the potential violation of the security policy by:
   identifying a different deployment action that does not violate the security policy; and
   adding the different deployment action to the command.

20. A non-transitory computer-readable medium comprising one or more computer-executable instructions that, when executed by at least one processor of a computing device, cause the computing device to:
   authenticate, via a policy-enforcement proxy computing system, an application container that facilitates launching at least one application on a host computing system by verifying that the application container meets a certain trustworthiness threshold;
   intercept, via the policy-enforcement proxy computing system, a command to perform a deployment action on the host computing system in connection with the authenticated application container;
   determine, via the policy-enforcement proxy computing system, that the deployment action in connection with the authenticated application container potentially violates a security policy for the host computing system that defines a whitelist of application containers allowed to deploy on the host computing system; and
   in response to determining that the deployment action potentially violates the security policy, prevent the potential violation of the security policy by modifying, via the policy-enforcement proxy computing system, the command to perform the deployment action.

* * * * *